Oct. 18, 1927.
S. MASON
1,646,032
ORE SAMPLING MACHINE
Filed May 4, 1925
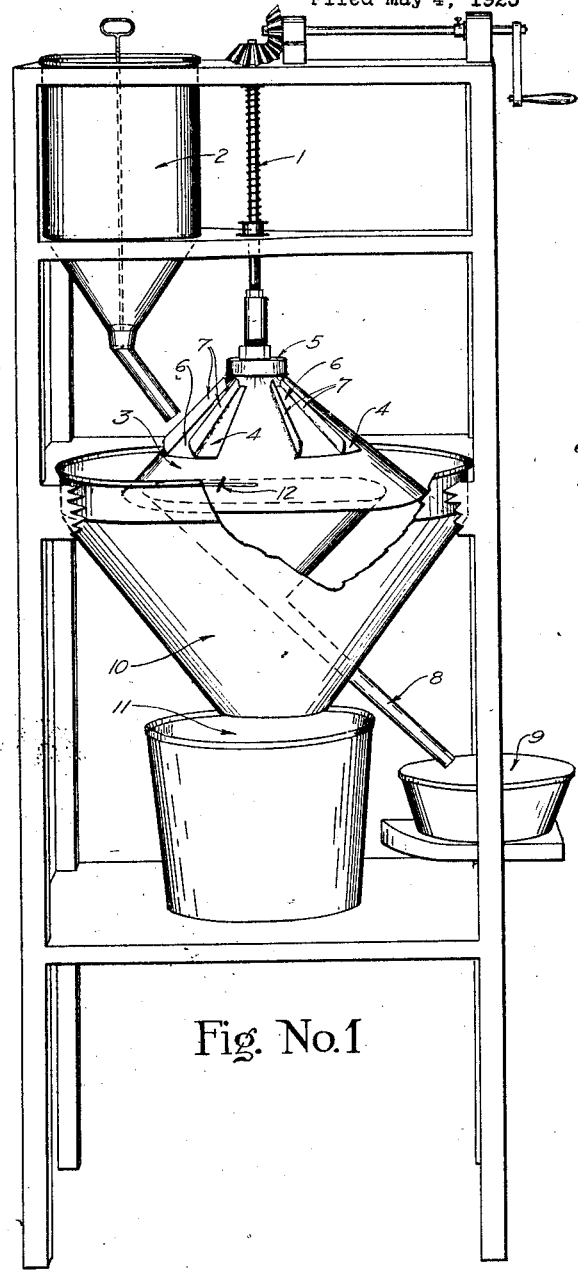
Fig. No.1
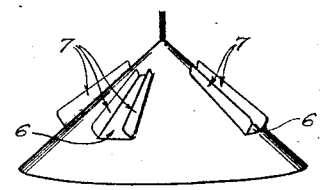
Fig. No.2
Inventor
Seward Mason Patented Oct. 18, 1927.

1,646,032

UNITED STATES PATENT OFFICE.

SEWARD MASON, OF HELENA, MONTANA.

ORE-SAMPLING MACHINE.

Application filed May 4, 1925. Serial No. 27,999.

The object of my invention is to secure for sample purposes a representative and proportional part of any given amount of sand, gravel, ore, grain or any other granular substance or material.

The mechanism of my machine is illustrated in the accompanying drawing in which Figure 1 is a detailed view in perspective of the entire machine with the adjustable proportionaling device attached. Figure 2 is a similar view of the fixed proportionaling device detached and separate. The same numerals refer to the same parts in both views; 1 in Figure 1 is the driven shaft, 2 is a storage tank. 3 is a frustum of a cone overlapping the cone 4, which may be either fixed to, or detachable from the shaft 1 at the socket 5. 6 represents the openings or apertures in the surface or surfaces of the cone or cones. 7 represents the wings or flanges on each side of the openings or apertures 6. 8 is the collecting receptacle and 9 the receiving receptacle for the minor portion of the substance or material being sampled. 10 is the collecting receptacle and 11 the receiving receptacle for the major portion of the substance or material being sampled.

I attain these objects by placing the substance or material being sampled in the storage tank 2, and causing it to fall upon a revolving geometrical figure preferably a cone or cones, which may be either fixed to, or detachable from the shaft 1 at the socket 5, such as one of the proportionaling devices shown in Figure 2, which is for sampling ore, where accuracy and cleanliness is important, a cone as shown in Figure 2, having one or more fixed openings or apertures through its surface preferably four, as shown by 6 in Figure 2, with wings or flanges 7, on each side of the openings or apertures; and in the case of sampling sand, gravel, grains or other granular substances or materials in which accuracy and cleanliness is less important, an adjustable proportionaling device which is shown in Figure 1, a frustum of a cone 3 overlapping the cone 4 which may also be either fixed to or detachable from the shaft 1, at socket 5, each of these cones having one or more openings or apertures 6, preferably four of equal size through their surfaces. The sum of the areas of the four openings or apertures equals one-half of the area of the segment of the cones subscribed by the upper and lower limits of the openings or apertures. At the side of and parallel with both edges of the openings or apertures are wings or flanges 7. The forward or left hand wings or flanges are attached to or a part of the frustum of a cone 3. The rear or right hand wings or flanges are attached to or a part of the cone 4, and project up through the openings or apertures in the frustum of a cone 3, thereby providing wings or flanges on both sides of the openings or apertures, which are adjusted in size by sliding the frustum of a cone 3, upon the cone 4, and thereafter being held in the adjusted position by the set screw 12, and the shoulder or collar of the socket 5.

The substance or material passing through these openings or apertures is then caught in any conveniently shaped collecting receptacle such as an inverted cone 8, and is then conveyed to a separate receiving receptacle 9, which is usually the minor portion of the substance or material being sampled. The other or usually the major portion of the substance or material being sampled which falls upon that area of the surface of the revolving proportionaling device not allotted to the openings or apertures 6, continues to flow down and passes over the edge or edges of the cone or cones and is caught in any conveniently shaped collecting receptacle such as a frustum of an inverted cone 10, and is conveyed to a separate receiving receptacle 11.

For ore sampling purposes I prefer to use a set of five detachable single cones having fixed open areas of one-tenth to five-tenths inclusive, one of which is shown in Figure 2. For sampling sand, gravel, grains or other similar substances or materials I prefer to use the adjustable double cones, the open area of which can be adjusted up to one-half of the cones' total area.

I claim:

1. A sampling machine of the class described, including a frame, a cone-shaped member, means for rotatably mounting the cone-shaped member in the frame, a second cone-shaped member on the first cone-shaped member, said second cone-shaped member having openings, the first cone-shaped member having openings, a wing extending from each of the opposite edges of the openings in the two members, the wings from the inner member extending through the openings of the outer member, and means for holding the members in different adjusted positions in relation to each other.

2. A sampling machine of the class described including a frame, a shaft rotatable in the frame, means for rotating the shaft, a cone-shaped member attached to the shaft and provided with a plurality of openings, wings projecting from the edges of the openings of the member, one wing projecting from one edge of each opening, a second cone-shaped member disposed over the first cone-shaped member and attached to the shaft and having openings through which said wings extend, other wings extending from the edges of the openings in the second cone-shaped member, one of said other wings extending from one edge of each of said openings in said second cone-shaped member, means for adjusting the cone-shaped members in relation to each other, so that the distance between the wings of one member is varied in relation to the wings of the other member, means for directing material onto the exterior surface of the outer cone-shaped member, means for receiving the material from the exterior surface of the outer cone-shaped member, and means for receiving the material which passes through the openings.

SEWARD MASON.